(12) United States Patent
Kim et al.

(10) Patent No.: US 11,579,728 B2
(45) Date of Patent: Feb. 14, 2023

(54) TOUCH DISPLAY DEVICE, TOUCH DRIVING CIRCUIT AND DISPLAY PANEL

(71) Applicant: LG Display Co., Ltd., Seoul (KR)

(72) Inventors: Jinseong Kim, Paju-si (KR); JuHan Kim, Paju-si (KR); Haewon Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/528,940

(22) Filed: Nov. 17, 2021

(65) Prior Publication Data

US 2022/0206663 A1    Jun. 30, 2022

(30) Foreign Application Priority Data

Dec. 28, 2020    (KR) ........................ 10-2020-0184904

(51) Int. Cl.
    *G06F 3/041*        (2006.01)
    *G06F 3/044*        (2006.01)
    *G09G 3/20*         (2006.01)

(52) U.S. Cl.
    CPC .......... *G06F 3/04184* (2019.05); *G06F 3/044* (2013.01); *G06F 3/0412* (2013.01); *G09G 3/20* (2013.01); *G09G 2310/0286* (2013.01); *G09G 2354/00* (2013.01)

(58) Field of Classification Search
    CPC .... G06F 3/04184; G06F 3/0412; G06F 3/044; G09G 3/20; G09G 2310/0286; G09G 2354/00
See application file for complete search history.

(56) References Cited

U.S. PATENT DOCUMENTS 6,677,925 B1   1/2004   Kawaguchi et al.
9,223,425 B1 *   12/2015   Kim .................... G06F 3/04166
9,665,208 B2   5/2017   Kim et al.
(Continued)

FOREIGN PATENT DOCUMENTS

JP    2001-147420 A    5/2001
JP    2015-106411 A    6/2015
(Continued)

OTHER PUBLICATIONS

Extended European Search Report, European Patent Application No. 21204779.9, dated May 2, 2022, 9 pages.
(Continued)

*Primary Examiner* — Hong Zhou
(74) *Attorney, Agent, or Firm* — Fenwick & West LLP

(57) ABSTRACT

A touch display device of the present disclosure may include a display panel on which a plurality of touch electrodes are electrically connected to a plurality of touch lines; a gate driving circuit for supplying scan signals to the display panel through a plurality of gate lines; a touch driving circuit for sensing a touch by detecting a touch signal from the plurality of touch electrodes and supplying a common voltage to the touch electrodes through the touch lines; a common voltage feedback line electrically connected to the plurality of touch lines or disposed to overlap with the plurality of gate lines in a non-display area of the display panel; and a common voltage compensation circuit for supplying a compensated common voltage based on a distortion in the common voltage.

20 Claims, 10 Drawing Sheets

(56) References Cited

U.S. PATENT DOCUMENTS

| | | | |
|---|---|---|---|
| 9,851,825 B2 | 12/2017 | Kim et al. | |
| 10,372,257 B2 | 8/2019 | Kim et al. | |
| 11,301,086 B2 | 4/2022 | Muguruma et al. | |
| 2013/0335342 A1* | 12/2013 | Kim | G06F 3/0443 345/173 |
| 2013/0342431 A1 | 12/2013 | Saeedi et al. | |
| 2014/0210783 A1* | 7/2014 | King-Smith | G06F 3/0416 345/174 |
| 2015/0145821 A1 | 5/2015 | Kim et al. | |
| 2016/0117023 A1* | 4/2016 | Hotelling | G09G 3/3614 349/12 |
| 2016/0180781 A1* | 6/2016 | Kim | G09G 3/3655 345/212 |
| 2016/0320898 A1 | 11/2016 | Tang et al. | |
| 2017/0090643 A1 | 3/2017 | Kim et al. | |
| 2018/0120996 A1* | 5/2018 | Kang | G09G 3/3696 |
| 2020/0004400 A1* | 1/2020 | Muguruma | G06F 3/04182 |

FOREIGN PATENT DOCUMENTS

| | | |
|---|---|---|
| JP | 2016-118767 A | 6/2016 |
| KR | 10-2020-0068286 A | 6/2020 |
| TW | I530854 B | 4/2016 |
| TW | 201624458 A | 7/2016 |
| TW | 201712657 A | 4/2017 |
| TW | 202014869 A | 4/2020 |

OTHER PUBLICATIONS

Office Action, Japan Patent Office Application No. 2021-202183, dated Nov. 15, 2022, 10 pages.

* cited by examiner

TOUCH DISPLAY DEVICE, TOUCH DRIVING CIRCUIT AND DISPLAY PANEL

CROSS REFERENCE TO RELATED APPLICATION

This application claims priority from Republic of Korea Patent Application No. 10-2020-0184904, filed on Dec. 28, 2020, which is hereby incorporated by reference in its entirety.

BACKGROUND

Technical Field

The present disclosure relates to a touch display device, a touch driving circuit and a display panel.

Background Art

With the development of multimedia, the importance of flat panel display devices is increasing. In response to this, flat panel display devices such as a liquid crystal display, a plasma display panel, and an organic light emitting display are commercially available.

In addition, a touch display device, in which a touch panel is stacked on such a flat panel display device, that generates information corresponding to a touch point where a hand or a stylus pen comes into contact from a sense of the touch point or performs calculation about a touch operation is widely used by using a feature that electrical characteristics such as resistance or capacitance change at the touch point.

Such a touch display device is one of the user interfaces, and its application is expanding to small portable terminals, office devices, mobile devices, and the like.

However, when the touch panel is separately stacked on the flat panel display device, the touch display device becomes thicker. Thus, there is a limitation in manufacturing the flat panel display device to be thin, a light transmission efficiency decreases by passing through the laminated touch panel, and a manufacturing cost increases. In order to solve such problems, recently, an advanced in-cell touch (AIT) type display device in which touch electrodes are embedded in pixel area of the display panel has been proposed.

Meanwhile, the load of the touch electrode disposed in the display panel increases as the size and resolution of the touch display device increase. Accordingly, it may cause an error in the image displayed on the display panel due to a distortion phenomenon of the common voltage supplied to the touch electrode.

SUMMARY

Embodiments of the present disclosure may provide a touch display device, a touch sensing device and a display panel enable to reduce the distortion phenomenon of the common voltage caused by a load of the touch electrodes.

In addition, embodiments of the present disclosure may provide a touch display device, a touch driving circuit and a display panel enable to effectively reduce the distortion phenomenon of the common voltage by a feedback structure of the common voltage supplied to the touch electrodes.

In addition, embodiments of the present disclosure may provide a touch display device, a touch driving circuit and a display panel enable to effectively detect and compensate the distortion of the common voltage by changing the structure of the common voltage feedback line according to a structure of the touch electrodes.

In one embodiment, a touch display device comprises: a display panel including a plurality of touch electrodes that are electrically connected to a plurality of touch lines disposed within a display area that displays an image, the plurality of touch lines extending in a first direction; a gate driving circuit configured to supply scan signals to the display panel through a plurality of gate lines extending in a second direction, the second direction different from the first direction; a touch driving circuit configured to sense a touch by detecting a touch signal from the plurality of touch electrodes during a touch driving period and supply a common voltage to the plurality of touch electrodes through the plurality of touch lines for displaying the image during a display driving period; a common voltage feedback line disposed in a non-display area of the display panel and electrically connected to the plurality of touch lines or overlapping with the plurality of gate lines in the non-display area of the display panel; and a common voltage compensation circuit configured to detect a distortion of the common voltage and supply a compensated common voltage that is generated based on the distortion of the common voltage through the plurality of touch lines.

In one embodiment, a touch driving device comprising: a plurality of touch lines extending in a direction, the plurality of touch lines configured to transmit touch signals to a display panel that includes a plurality of touch electrodes; a touch sensing circuit configured to supply touch driving signals to the plurality of touch electrodes through the plurality of touch lines and receive touch sensing signals from the plurality of touch electrodes during a touch driving period, and supply a common voltage to the plurality of touch electrodes through the plurality of touch lines during a display driving period; a touch controller configured to detect touch presence responsive to the touch sensing signals and calculate touch coordinates according to the touch sensing signals; a common voltage feedback line electrically connected to the plurality of touch lines or overlapping with the plurality of gate lines; and a common voltage compensation circuit configured to detect a distortion of the common voltage and supply a compensated common voltage that is generated based on the distortion of the common voltage through the plurality of touch lines.

A display panel comprises: a plurality of touch electrodes, each of the plurality of touch electrodes corresponding to a respective plurality of subpixels included in the display panel; a plurality of touch lines extending in a first direction, the plurality of touch lines configured to transmit touch signals to the plurality of touch electrodes; a plurality of gate lines extending in a second direction that is different from the first direction, the plurality of gate lines configured to transmit scan signals to the plurality of subpixels; and a common voltage feedback line electrically connected to the plurality of touch lines or overlapping with the plurality of gate lines in a non-display area of the display panel.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
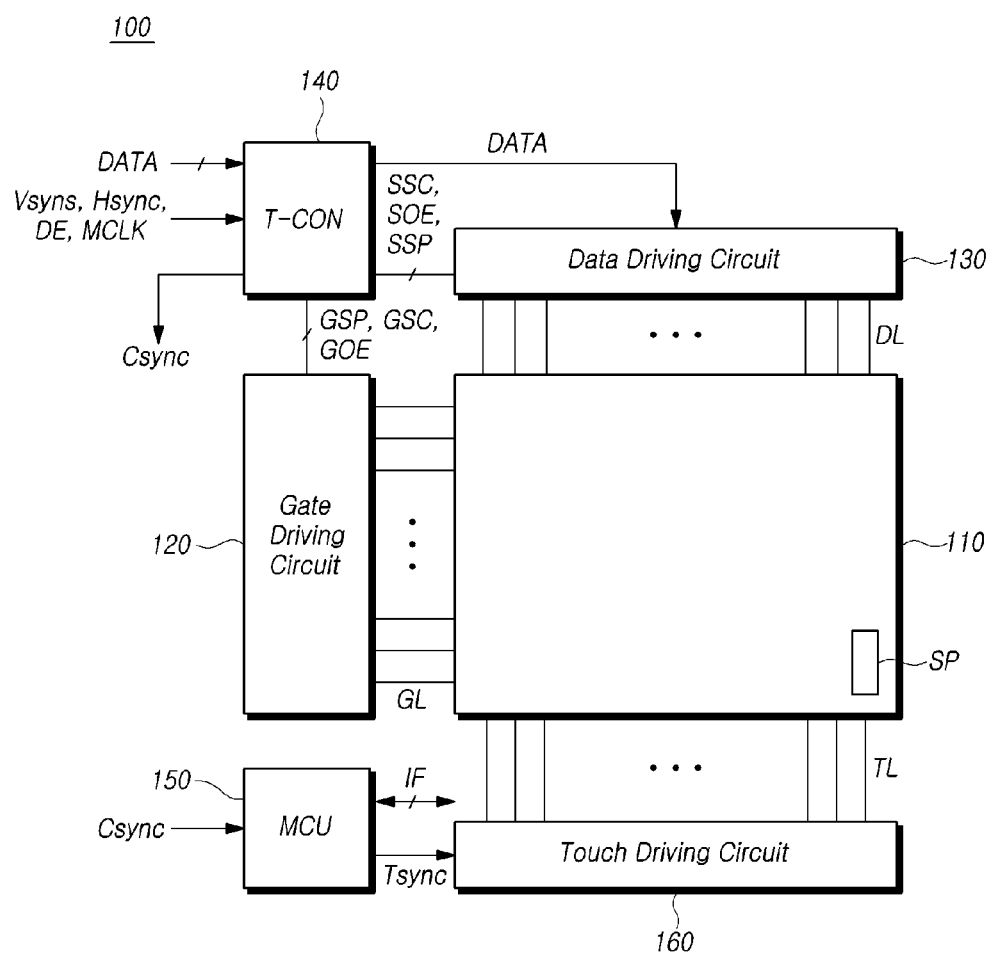
FIG. 1 illustrates a block diagram of a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

FIG. 1 illustrates a block diagram of a touch display device according to embodiments of the present disclosure.

Referring to FIG. 1, the touch display device according to embodiments may include a display panel 110, a gate driving circuit 120, a data driving circuit 130, a touch driving circuit 160, a timing controller (T-CON) 140, and a micro control unit (MCU) 150.

The display panel 110 displays images on the basis of a scan signal transferred from the gate driving circuit 120 through gate lines GL and a digital image data DATA transferred from the data driving circuit 130 through data lines DL.

In the case of a liquid crystal display device, the display panel 110 may operate in any known mode, such as twisted nematic (TN) mode, vertical alignment (VA) mode, in-plane switching (IPS) mode, or fringe field switching (FFS) mode. On the other hand, in the case of an organic light emitting display device, the display panel 110 may be implemented in a top emission structure, a bottom emission structure, or a dual emission structure.

A plurality of subpixels SP of the display panel 110 may be defined by a plurality of data lines DL and a plurality of gate lines GL. A single subpixel SP may include a thin-film transistor (TFT) provided in an area in which a single data line DL intersects a single gate line GL, a light emitting element, such as an organic light emitting diode, to be charged with the data voltage Vdata, a storage capacitor Cst electrically connected to the light emitting element to maintain the voltage, and the like.

A black matrix, a color filter, and the like may be provided on the upper substrate of the display panel 110, while thin-film transistors, subpixels SPs, common electrodes CEs, and the like, may be provided on the lower substrate of the display panel 110. The display panel 110 may be provided using a color-filter-on-TFT (COT) structure. In this case, the black matrix and the color filter may be provided on the lower substrate of the display panel 110.

The common electrodes, to which a common voltage is supplied, may be provided on the upper substrate or the lower substrate of the display panel 110. Polarizers may be attached to the upper substrate and the lower substrate of the display panel 110, and alignment films for setting the tilt angles of liquid crystal molecules may be provided on inner surfaces of the upper and lower substrates in contact with the liquid crystal layer.

Column spacers for maintaining the cell gap of liquid crystal cells are provided between the upper substrate and the lower substrate of the display panel 110. In the liquid crystal display device, a backlight unit is disposed below the bottom surface of the lower polarizer of the display panel 110. The backlight unit may be implemented as an edge-type backlight unit or a direct-type backlight unit to illuminate the display panel 110.

Here, a touch panel having an in-cell touch structure may be embedded in a pixel array region of the display panel 110. The in-cell touch panel uses electrodes in the shape of blocks (or points), for example, provided inside the display panel 110, as touch electrodes.

The timing controller 140 controls the gate driving circuit 120 and the data driving circuit 130. The timing controller 140 receives timing signals, such as a vertical synchronization signal Vsync, a horizontal synchronization signal Hsync, a data enable signal DE, and a main clock signal MCLK, as well as the digital image data DATA of an image signal, from a host system (not shown).

The timing controller 140 controls the gate driving circuit 120, on the basis of scan timing control signals, such as a gate start pulse signal GSP, a gate shift clock signal GSC, and a gate output enable signal GOE. In addition, the timing controller 140 controls the data driving circuit 130, on the basis of data timing control signals, such as a source sampling clock signal SSC, a source start pulse SSP, and a source output enable signal SOE.

The gate driving circuit 120 sequentially drives the plurality of gate lines GL by sequentially supplying the scan signals to the display panel 110 through the plurality of gate lines GL. Herein, the gate driving circuit 120 may also be referred to as a scan driving circuit or a gate driving integrated circuit (GDIC).

The gate driving circuit 120 may include one or more gate driving integrated circuits (GDICs), and may be located on or adjacent to one or both sides of the display panel 110 depending on the driving method. Alternatively, the gate driving circuit 120 may be implemented using a gate-in-panel structure in which the gate driving circuit 120 is embedded in a bezel area of the display panel 110.

The gate driving circuit 120 sequentially supplies the scan signals having an on or off voltage to the plurality of gate lines GL, under the control of the timing controller 140. In this regard, the gate driving circuit 120 may include a shift register, a level shifter, and the like.

The data driving circuit 130 drives the plurality of data lines DL by supplying the digital image data DATA, received from the timing controller 140, to the plurality of data lines DL. Herein, the data driving circuit 130 may also be referred to as a source driving circuit or a source driving integrated circuit (SDIC).

The data driving circuit 130 may include one or more source driving integrated circuits (SDICs). The source driving integrated circuits (SDICs) may be connected to bonding pads of the display panel 110 by a tape-automated bonding (TAB) method or a chip-on-glass (COG) method, may be directly mounted on the display panel 110, or in some cases, may be provided as integrated portions of the display panel 110. In addition, the source driving integrated circuits (SDICs) may be implemented using a chip-on-film (COF) structure. In this case, the source driving integrated circuits may be mounted on a circuit film and be electrically connected to the data lines DL of the display panel 110 via the circuit film.

When a specific gate line GL is turned on by the gate driving circuit 120, the data driving circuit 130 converts the digital image data DATA, received from the timing controller 140, into an analog data voltage, and supplies the analog data voltage to the plurality of data lines DL.

The data driving circuit 130 may be located on the upper or lower portion of (or above or below) the display panel 110, or may be located on both the upper and lower portions of (or above and below) the display panel 110, depending on the driving method, the design, or the like.

The data driving circuit 130 may include a shift register, a latch circuit, a digital-to-analog converter (DAC), an output buffer, and the like. The digital-to-analog converter is a component for converting the digital image data, received from the timing controller 140, into an analog data voltage to be supplied to the data lines DL.

The touch driving circuit 160 detects a touch on the display panel 110 and determines a touch location on the display panel 110. The touch driving circuit 160 may include a touch sensing circuit that generates touch driving signals to drive the touch electrodes and receives touch sensing signals generated in the touch electrodes, and a touch controller that processes the touch sensing signals to detect touch presence and touch coordinates. The touch sensing circuit and the touch controller of the touch driving circuit 160 may be implemented as a single integrated circuit referred to as a read-out integrated circuit (ROIC) or be provided as separate circuits divided depending on the function.

In addition, the source driving integrated circuits (SDIC) of the data driving circuit 130 and the read-out integrated circuit (ROIC) of the touch driving circuit 160 may be combined into a combined integrated circuit (SRIC).

The touch driving circuit 160 may be provided on an outer substrate connected to the display panel 110. The touch driving circuit 160 is connected to the display panel 110 via a plurality of touch lines TL. The touch driving circuit 160 may detect the presence of the touch and determine the touch position, on the basis of a difference in capacitance among the touch electrodes in the display panel 110. That is, a difference in capacitance occurs between a position located by a finger of a user and a position not located by the finger, and the touch driving circuit 160 determines the presence and position of the touch by detecting the difference in capacitance. The touch driving circuit 160 generates a touch sensing voltage regarding the present and location of the touch and transfers the touch sensing voltage to the micro control unit 150.

The micro control unit 150 controls the touch driving circuit 160. The micro control unit 150 may receive a control synchronization signal Csync from the timing controller 140 and generate a touch synchronization signal Tsync, on the basis of the control synchronization signal Csync, to control the touch driving circuit 160. The micro control unit 150 transmits and receives a touch sensing signal or the like to and from the touch driving circuit 160, on the basis of an interface IF defined therebetween.

Here, the micro control unit 150 may be combined with the touch driving circuit 160 into a touch control circuit comprised of a single IC or may be combined with the timing controller 140 into a control circuit comprised of a single integrated circuit.

In addition, the touch display device may further include a memory. The memory may temporarily store the digital image data DATA transmitted from the timing controller 140 and may supply the digital image data DATA to the data driving circuit 130 in predetermined time. The memory may be disposed inside or outside the data driving circuit 130. In a case in which the memory is disposed outside the data driving circuit 130, the memory may be disposed between the timing controller 140 and the data driving circuit 130. In addition, the memory may include a buffer memory to store the digital image data DATA received from an external source and supply the stored digital image data DATA to the timing controller 140.

In addition, the touch display device may further include an interface enabling signal input and output to and from, or communications with, other external electronic devices or electronic components. For example, the interface may include at least one of a Serial Peripheral Interface (SPI), a low-voltage differential signaling (LVDS) interface, or a mobile industry processor interface (MIPI).

Meanwhile, the touch display device 100 may sense the touch presence or the touch coordinate based on capacitance formed by touch electrodes TE.

The touch display device 100 may sense a touch by a mutual-capacitance scheme or a self-capacitance scheme, as a capacitance based touch sensing scheme.

In the case of a touch sensing scheme based on mutual-capacitance, a plurality of touch electrodes may be classified as touch driving electrodes which are supplied touch driving signals through touch driving lines, and touch sensing electrodes which form capacitances with the touch driving electrodes and supply touch sensing signals through touch sensing lines. Here, the touch driving lines and the touch sensing lines may be referred to as touch lines.

In the case of the touch sensing scheme based on mutual-capacitance, the touch presence and the touch coordinate may be detected based on a change of mutual-capacitance formed between the touch driving electrode and the touch sensing electrode according to a presence of a pointer such as a finger, a pen, or the like.

In the case of the touch sensing scheme based on self-capacitance, each touch electrode serves as both the touch driving electrode and the touch sensing electrode. That is, a touch driving signal is supplied to a touch electrode through a touch line, and a touch sensing signal generated in the touch electrode, to which the touch driving signal is supplied, is transmitted through the same touch line. Accordingly, in the case of the touch sensing scheme based on self-capacitance, there is no distinction between the touch driving electrode and the touch sensing electrode and no distinction between the touch driving line and the touch sensing line.

In the case of the touch sensing scheme based on self-capacitance, the touch presence and a touch coordinate may be detected based on a change in capacitance formed between a pointer such as a finger, a pen, or the like, and a touch electrode TE.

Thus, the touch display device 100 may sense a touch by the touch sensing scheme based on mutual-capacitance or the touch sensing scheme based on self-capacitance.

Further, such a touch display device 100 may be various types of display devices, such as a liquid crystal display device, an organic light emitting display device, a plasma display panel, a quantum dot display device, and the like.

In the touch display device 100 according to embodiments of the present disclosure, a plurality of touch electrodes may be arranged on the display panel 110, and may be common electrodes to which a common voltage for displaying images is supplied.

When the touch display device 100 is the organic light emitting display device, the touch display device 100 may include an organic light emitting diode composed of a first electrode (anode electrode), an organic light emitting layer, and a second electrode (cathode electrode), an encapsulation layer located on the second electrode and having an encapsulating function, and a touch sensor metal layer located on the encapsulation layer. Here, a plurality of touch electrodes TE may be formed on the touch sensor metal layer, or may be formed on the second electrode layer constituting the cathode electrode of the organic light emitting diode.

Meanwhile, a common voltage supplied to the common electrode or the touch electrode may be a direct voltage with a specific voltage level for a predetermined time while the level of the data voltage supplied to the display panel 110 is changed within the display driving period. In addition, the common voltage supplied to the common electrodes or the touch electrodes may be used as a display voltage or other names depending on the type of the liquid crystal display device or the organic light emitting display device.

Figure 2:
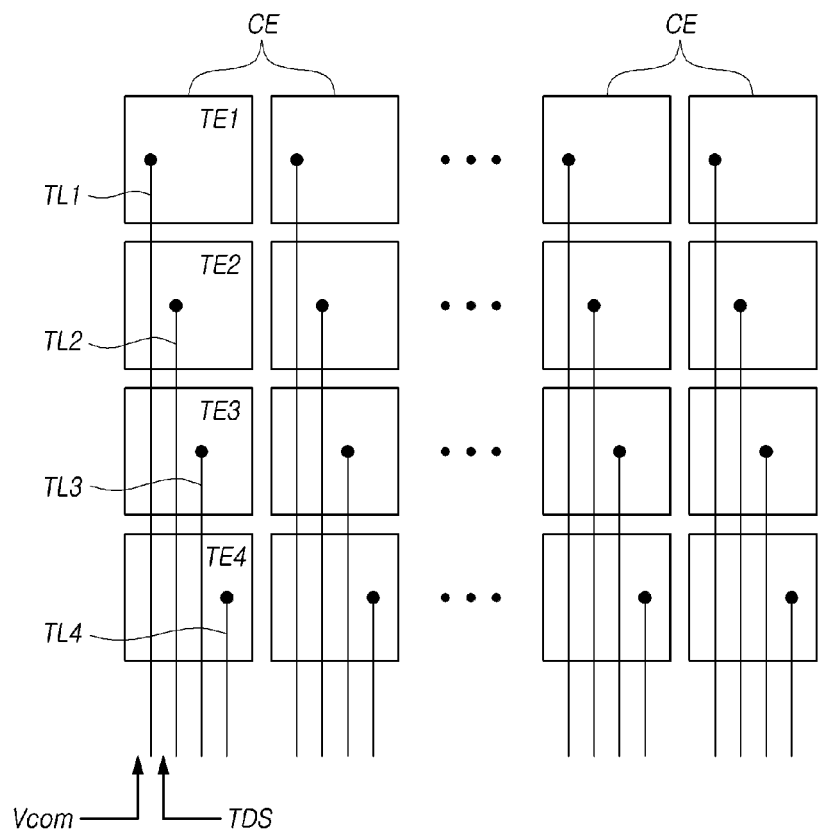
FIG. 2 illustrates a structure of touch electrodes in the touch display device according to embodiments of the present disclosure.

FIG. 2 illustrates a structure of touch electrodes in the touch display device according to embodiments of the present disclosure.

Referring to FIG. 2, a touch panel in the touch display device 100 according to embodiments of the present disclosure may be embedded in the pixel array region of the display panel 110 of an in-cell touch structure. In this case, the display panel 110 of in-cell touch structure may use common electrodes CE configured in a block or point shape as the touch electrodes TE.

In the display panel 110 of the in-cell touch structure, a common electrode CE corresponding to the plurality of subpixels SP in the display panel 110 forms a touch electrode TE. The touch electrode TE may be defined by the common electrode CE formed separately from the display panel 110.

A plurality of touch electrodes TE (e.g., TE1 to TE4) may be arranged in a row in a display area of the display panel 110. Each touch electrode TE may be connected to a corresponding touch line TL (e.g., one of touch lines TL1 to TL4) to transmit a touch driving signal TDS and receive a touch sensing signal.

The touch electrodes TE may be implemented as touch sensor metals that sense a touch input using a capacitance-based touch sensing method. In this case, the touch electrodes TE may receive the common voltage Vcom during a display driving period and receive the touch driving signal TDS during a touch driving period.

Figure 3:
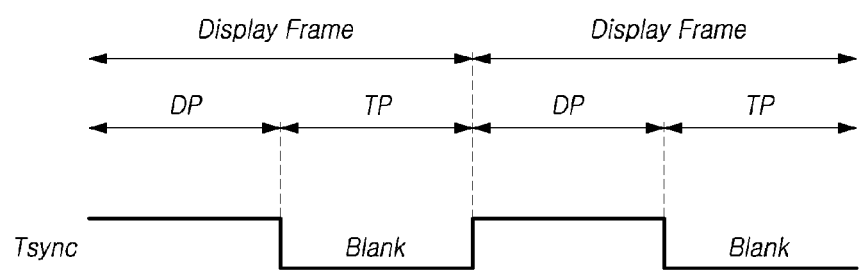
FIG. 3 illustrates timings for configuring a display driving period and a touch driving period in the touch display device according to embodiments of the present disclosure.

FIG. 3 illustrates timings for configuring a display driving period and a touch driving period in the touch display device according to embodiments of the present disclosure.

Referring to FIG. 3, within a display frame period, touch display device 100 according to embodiments of the present disclosure performs display driving for displaying images during the predefined display driving period DP, and performs touch driving for sensing a touch input from a finger or a stylus during the predefined touch driving period TP.

The touch display device 100 uses a common electrode CE for driving each pixel as an electrode for sensing a touch. Accordingly, a common voltage Vcom is provided to thin film transistor connected to the common electrode CE during the display driving period DP, and a touch driving signal TDS is provided to the common electrode CE acting as a touch electrode TE during the touch driving period TP.

The display driving period DP and the touch driving period TP may be equal in time, all or partly overlap with each other in time, or be separated from each other in time.

A driving method in which the display driving period DP and the touch driving period TP are separated from each other in time may be referred to as time division driving operation.

When the display driving period DP and the touch driving period TP are equal in length of time, the display driving operation and the touch driving operation may be performed simultaneously. This driving method may be referred to as time free driving operation.

In the time division driving operation, the display driving period DP and the touch driving period TP may be alternately arranged.

Thus, when the display driving period DP and the touch driving period TP are separated in time while alternately being arranged, the touch driving period TP may correspond to a blank period Blank in which the display driving operation is not performed.

The touch display device 100 may generate a touch synchronization signal Tsync that swings between a high level and a low level that is less than the high level, and through this, may identify or control the display driving period DP and the touch driving period TP. That is, the touch synchronization signal Tsync may be a driving timing control signal for defining the touch driving period TP.

For example, a high level period (or a low level period) of the touch synchronization signal Tsync may correspond to the display driving period DP, and the low level period (or the high level period) of the touch synchronization signal Tsync may correspond to the touch driving period TP.

In this case, the touch driving circuit 160 may supply the touch driving signal TDS to the touch electrode TE in the touch driving period TP where the touch synchronization Tsync is at the low level, and may sense the touch presence and touch position of the passive stylus or the active stylus using a touch sensing signal received from the touch electrode TE.

Meanwhile, with respect to methods of assigning the display driving period DP and the touch driving period TP in one display frame period, for example, one display frame period may be divided into one display driving period DP and one touch driving period TP, and display driving operation may be performed during one display driving period DP, and touch driving operation for sensing a touch input from a finger and a stylus may be performed during one touch driving period TP corresponding to a blank period Blank.

The touch display device 100 performs the display driving operation at a screen refresh rate or once during one display frame period corresponding to a frame frequency.

For example, when the frame frequency is 60 Hz, display driving operation is performed to turn on or turn off pixels through N gate lines constituting the display panel 110 within a horizontal period of 1/60 second. After that, a touch sensing operation is performed for a predetermined interval as a touch driving period TP. In this case, the touch report rate will be 60 Hz.

In another example, one display frame period may be divided into two or more display driving periods DP and two or more touch driving periods TP, and display driving operation may be performed during two or more display driving periods DP in one display frame period, and touch driving operation for sensing once or two or more times a touch input from a finger and a stylus on all or at least a part of a display screen may be performed during two or more touch driving periods TP in one display frame period.

Like this, when dividing one display frame period into two or more display driving periods DP and two or more touch driving periods TP, and then performing the display driving operation and the touch driving operation, each of two or more blank periods corresponding to two or more touch driving periods TP in one display frame period is sometimes referred to as a long horizontal blank ("LHB").

Accordingly, two or more periods in which the sensing of a touch from a stylus or a finger is performed in a display frame period may be referred to as LHBs or touch driving periods TP, and touch driving operation performed during two or more LHBs in one touch frame period is referred to as "LHB driving operation".

Figure 4:
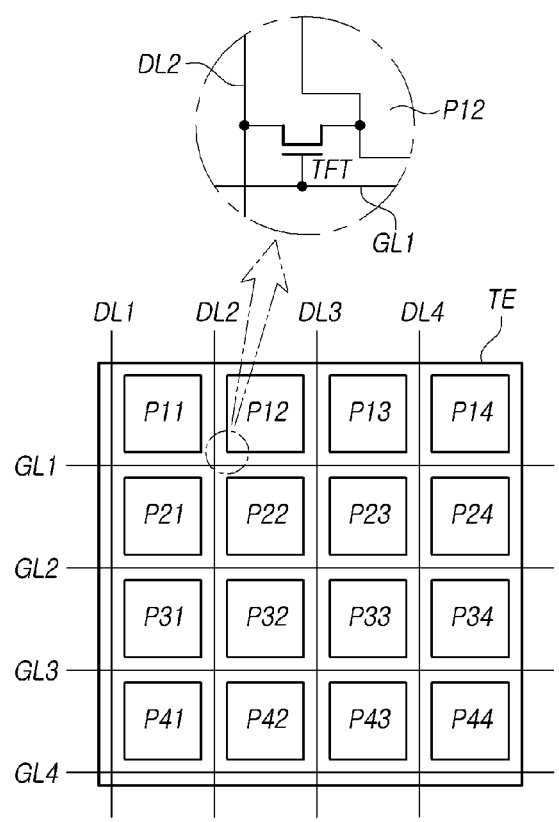
FIG. 4 illustrates a part of a touch electrode area in a touch display device according to embodiments of the present disclosure.

FIG. 4 illustrates a part of a touch electrode area in a touch display device according to embodiments of the present disclosure.

Referring to FIG. 4, the touch display device 100 according to embodiments of the present disclosure includes a plurality of thin film transistors TFT formed on a substrate, a plurality of pixel electrodes P11-P44 connected to a drain node or a source node of the plurality of thin film transistors TFT, and a touch electrode TE formed to overlap the plurality of pixel electrodes P11-P44 to form an electric field.

A gate node of the thin film transistor TFT is connected to a gate line to be controlled on-off according to a scan signal, and a source node or a drain node is connected to a data line DL to which a data voltage is supplied.

At this time, when a passive stylus such as a finger or an active stylus touches on the display panel 110, the touch display device 100 may recognize a change in capacitance of the touch electrode TE close to the contact position of the stylus and detect a touch position. That is, the touch display device 100 may supply a touch driving signal to the touch electrodes TE formed on the display panel 110, and then may sense a touch position by detecting a touch sensing signal received from the touch electrodes TE and detecting a change in capacitance of each of the touch electrodes TE.

At this time, a common voltage Vcom or a touch driving signal TDS is supplied to the touch electrode TE of the touch display device 100, and thus, a parasitic capacitance coupled to the touch electrode TE may be generated.

For example, parasitic capacitance may be generated between the gate line and the touch electrode TE by a scan signal supplied to the display panel 110 through the gate line. Due to this parasitic capacitance, a load on the touch electrode TE increases, distortion occurs in the common voltage supplied to the touch electrode TE, and a defective line may appear on the display panel 110.

Figure 5:
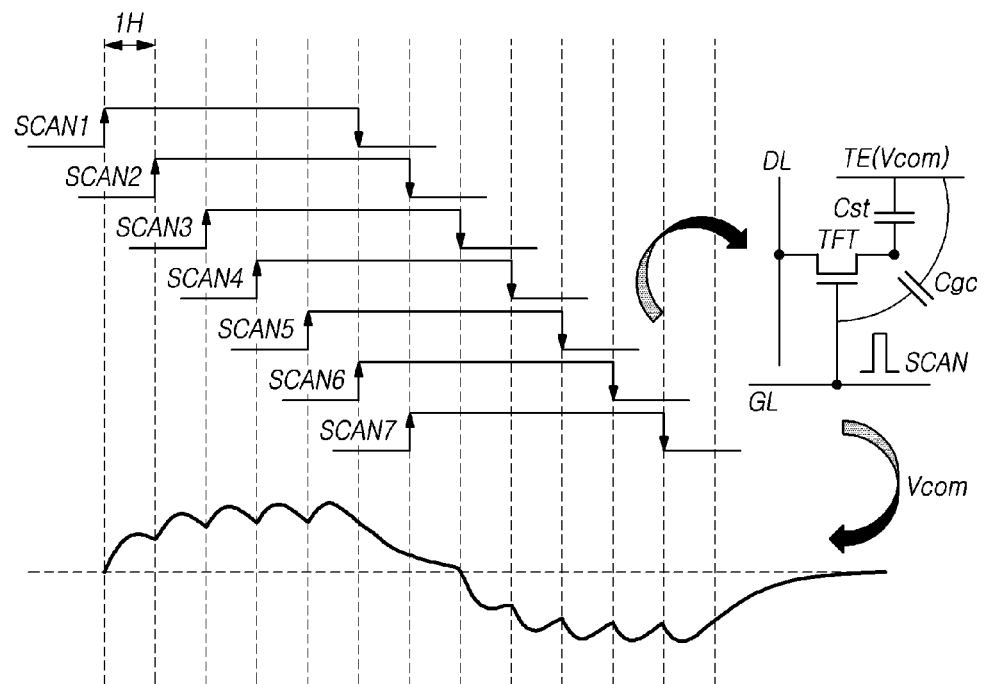
FIG. 5 illustrates a schematic diagram showing a distortion phenomenon of a common voltage caused by overlap of scan signals in a touch display device according to embodiments of the present disclosure.

FIG. 5 illustrates a schematic diagram showing a distortion phenomenon of a common voltage caused by overlap of scan signals in a touch display device according to embodiments of the present disclosure.

Referring to FIG. 5, the gate driving circuit 120 in the touch display device 100 according to embodiments of the present disclosure may sequentially supply the scan signals SCAN to the display panel 110 through the gate lines at an interval of one horizontal period 1H.

In this case, the gate driving circuit 120 may maintain the scan signals SCAN at a high level for a certain period. Here, it illustrates a case that the scan signals SCAN have a high level period of 5 horizontal periods 5H as an example.

As described above, when the scan signals SCAN with a predetermined high level period transmitted to the display panel 110 through the gate lines GL are supplied at intervals of one horizontal period 1H, an overlapping period is generated between the adjacent scan signals SCAN.

A parasitic capacitance Cgc may be accumulated between the gate node of the thin film transistor TFT and the touch electrode TE to be supplied with the common voltage Vcom by the overlapping period of the scan signals SCAN, and the common voltage Vcom may be distorted by the increase of a load on the touch electrode TE.

In particular, it is difficult to form feedback lines to detect the distortion of the common voltage Vcom supplied to the touch electrodes TE due to an effect on touch sensitivity in the touch display device 100 in which a plurality of touch electrodes TE are disposed.

Accordingly, the present disclosure may provide the touch display device 100 with the common voltage feedback lines for detecting the distortion of the common voltage Vcom to reduce the effect on the touch electrode TE.

Figure 6:
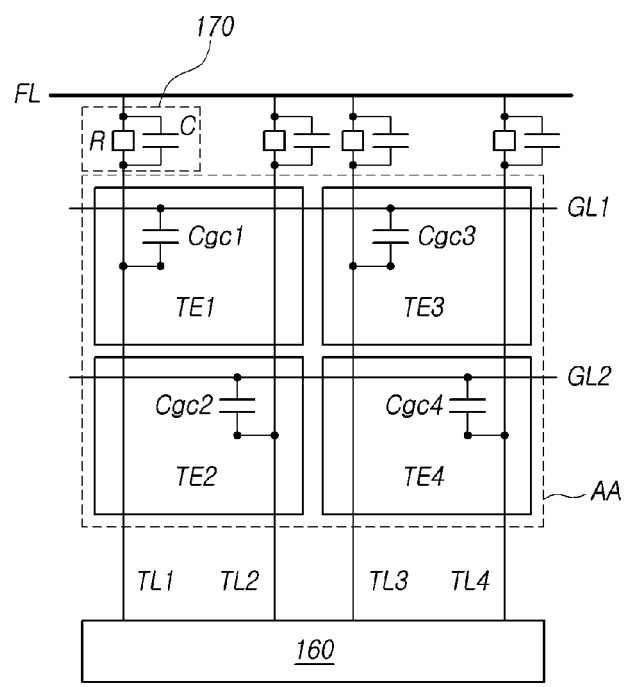
FIG. 6 illustrates a structure in which a common voltage feedback line is disposed to be connected to a touch line in a touch display device according to embodiments of the present disclosure.

FIG. 6 illustrates a structure in which a common voltage feedback line is disposed to be connected to a touch line in a touch display device according to embodiments of the present disclosure.

Referring to FIG. 6, the display panel 110 in the touch display device 100 according to embodiments of the present disclosure may use common electrodes CE configured in a block or point shape as touch electrodes TE.

In the display panel 110, a common electrode CE corresponding to the plurality of subpixels SP formed in the display area AA constitutes a touch electrode TE.

The plurality of touch electrodes TE may be arranged in a row in the display area AA of the display panel 110. Each touch electrode TE may be connected to the touch line TL for supplying a touch driving signal TDS during the touch driving period TP and receiving the touch sensing signal. Here, it illustrates a case in which four (2×2) touch electrodes TE1-TE4 are arranged in a matrix as an example.

At this time, the touch driving circuit 160 supplies the common voltages Vcom to the subpixels SP during the display driving period DP, and supplies the touch driving signals TDS during the touch driving period TP through the touch lines TL.

In this case, the common voltages Vcom supplied through the touch lines TL during the display driving period DP may be distorted due to parasitic capacitances Cgc1-Cgc4 between the gate lines GL1, GL2 and the touch electrodes TE1-TE4 due to the overlap of the scan signals SCAN supplied through the gate lines GL1, GL2.

The touch display device 100 of the present disclosure may include a common voltage feedback line FL extending from the touch line TL along a non-display area located opposite to the touch driving circuit 160 based on the display area AA in order to detect the distortion of the common voltage Vcom.

Specifically, the common voltage feedback line FL extending along the non-display area located opposite to the touch driving circuit 160 may be electrically connected to a plurality of touch lines TL1-TL4 in contact with the plurality of touch electrodes TE1-TE4.

For the purpose of above, the common voltage feedback line FL may be disposed in a direction perpendicular to a direction in which the plurality of touch lines TL1-TL4 extend from the touch electrodes TE1-TE4. Accordingly, when the gate lines GL1, GL2 are orthogonal to the touch lines TL1-TL4, the common voltage feedback line FL may be disposed parallel to the gate lines GL1, GL2 in the non-display area and may be electrically connected to the touch lines TL1-TL4.

In this case, the common voltage feedback line FL may extend along the non-display area and be connected to a common voltage compensation circuit. The common voltage compensation circuit may detect the distortion in the common voltage and generate a compensated common voltage capable of counterbalancing the distortion waveform of the common voltage Vcom from the common voltage feedback line FL, and supply the compensated common voltage through the touch line TL.

The common voltage compensation circuit may be located inside the touch driving circuit 160 or may be located outside the touch driving circuit 160.

Meanwhile, a noise blocking circuit 170 may be disposed between the touch line TL and the common voltage feedback line FL extending to the non-display area in order to reduce an effect on the touch electrode TE by the common voltage feedback line FL. As shown in FIG. 6, each touch line TL is connected to the common voltage feedback line FL via a noise blocking circuit 170. Thus, a plurality of noise blocking circuits 170 are disposed in the touch display device.

Each noise blocking circuit 170 may include a resistor R and a capacitor C connected in parallel between the touch line TL and the common voltage feedback line FL.

In one embodiment, the resistor R and the capacitor C constituting the noise blocking circuit 170 have a high resistance and a high capacitance so that the effect of the common voltage feedback line FL does not influence the touch electrode TE.

Accordingly, when distortion of the common voltage Vcom occurs due to parasitic capacitances Cgc1-Cgc4 formed between the gate lines GL1, GL2 and the touch electrodes TE1-TE4 by the scan signals SCAN supplied through the gate lines GL1, GL2, the common voltage compensation circuit may prevent or at least reduce an image error due to distortion of the common voltage Vcom by detecting the distortion of the common voltage Vcom through the common voltage feedback line FL and supplying the compensated common voltage capable of compensating for the distorted common voltage Vcom.

Figure 7:
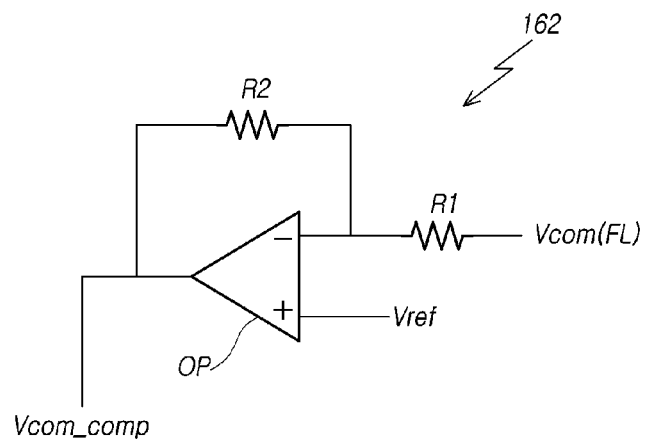
FIG. 7 illustrates an exemplary common voltage compensation circuit that generates a compensated common voltage to compensate for distortion of the common voltage in the touch display device according to embodiments of the present disclosure.

FIG. 7 illustrates an exemplary common voltage compensation circuit 162 that generates a compensated common voltage to compensate for distortion of the common voltage in the touch display device according to embodiments of the present disclosure.

Referring to FIG. 7, the common voltage compensation circuit 162 in the touch display device 100 according to embodiments of the present disclosure may include an operational amplifier OP that receives the common voltage Vcom fed back through the common voltage feedback line FL extending from the touch electrode TE at an inverting input terminal (−) through a first resistor R1 and receives a reference voltage Vref at a non-inverting input terminal (+). The common voltage compensation circuit 162 detects the distortion in the common voltage Vcom fed back through the common voltage feedback line FL based on a comparison of the common voltage and the reference voltage Vref. The comparison of the common voltage and the reference voltage Vref results in a difference between the signals which is representative of the distortion in the common voltage.

At this time, the reference voltage Vref supplied to the non-inverting input terminal (+) may be the same signal or a different signal from the common voltage Vcom supplied through the touch line TL.

Since the second resistor R2 is connected between the inverting input terminal (−) and the output terminal of the operational amplifier OP, the operational amplifier OP generates the compensated common voltage Vcom_comp by inverting and amplifying the fed back common voltage Vcom, according to the ratio of the first resistor R1 and the second resistor R2.

Accordingly, the common voltage compensation circuit 162 supplies the compensated common voltage Vcom_comp to the touch electrode TE through the touch line TL, so that a distorted component of the common voltage Vcom may be compensated. The compensating operation of the common voltage Vcom may be performed every frame by the common voltage compensation circuit 162.

Meanwhile, in the touch display device 100 of the present disclosure, the common voltage feedback line FL may be disposed on an extension of the gate line GL to form a capacitance with the gate line GL in order to detect the distortion of the common voltage Vcom due to the parasitic capacitance Cgc formed between the gate line GL and the touch electrode TE.

Figure 8:
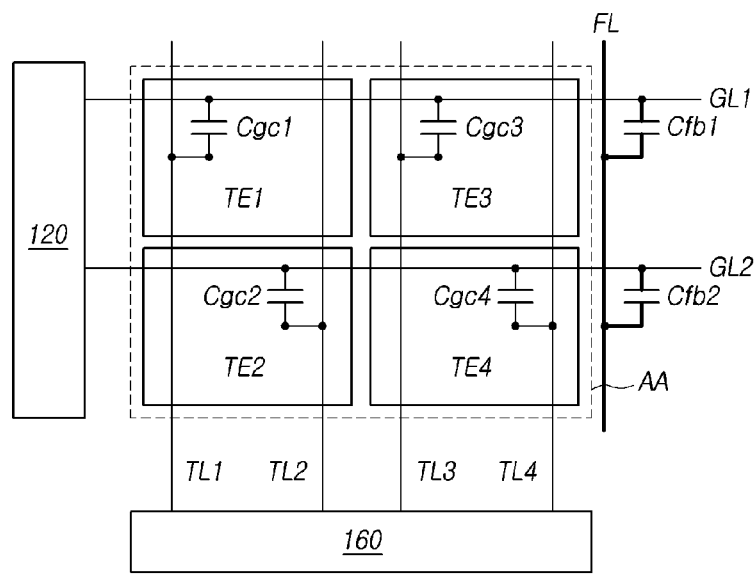
FIG. 8 illustrates an exemplary diagram of a structure in which a common voltage feedback line is disposed to form a capacitance with gate lines in the touch display device according to embodiments of the present disclosure.

FIG. 8 illustrates an exemplary diagram of a structure in which a common voltage feedback line is disposed to form a capacitance with gate lines in the touch display device according to embodiments of the present disclosure.

Referring to FIG. 8, the display panel 110 the touch display device according to embodiments of the present disclosure may use common electrodes CE configured in a block or point shape as the touch electrodes TE.

The plurality of touch electrodes TE may be arranged in a row in the display area AA of the display panel 110. Each touch electrode TE may be connected to the touch line TL for supplying a touch driving signal TDS during the touch driving period TP and receiving the touch sensing signal. Here, it illustrates a case in which four (2×2) touch electrodes TE1-TE4 are arranged in a matrix as an example.

At this time, the touch driving circuit 160 supplies the common voltages Vcom to the subpixels SP during the display driving period DP, and supplies the touch driving signals TDS during the touch driving period TP through the touch lines TL.

As previously described, the common voltages Vcom supplied through the touch lines TL during the display driving period DP may be distorted due to parasitic capacitances Cgc1-Cgc4 between the gate lines GL1, GL2 and the touch electrodes TE1-TE4 by overlap of the scan signals SCAN supplied through the gate lines GL1, GL2.

In order to detect the distortion of the common voltage Vcom, the touch display device 100 of the present disclosure may include a common voltage feedback line FL disposed in the direction crossing the gate lines GL1, GL2 in the non-display area in which the gate lines GL1, GL2 extend.

In this case, the non-display area in which the common voltage feedback line FL is disposed may be an area opposite to the gate driving circuit 120 based on the display area AA, and the common voltage feedback line FL may extend in a direction crossing the gate lines GL1, GL2.

When the gate lines GL1, GL2 are orthogonal to the touch lines TL1-TL4, the common voltage feedback line FL may be disposed to be parallel to the touch lines TL1-TL4 in the non-display area.

As described above, when the common voltage feedback line FL is disposed in the non-display area opposite to the gate driving circuit 120 in a direction crossing the gate lines GL1, GL2, the common voltage feedback line FL may respectively form feedback capacitances Cfb1, Cfb2 in an area crossing the gate lines GL1, GL2.

Accordingly, when the parasitic capacitances Cgc1-Cgc4 are formed between the gate lines GL1, GL2 and the touch electrodes TE1-TE4 by the scan signals supplied through the gate lines GL1, GL2, feedback capacitances Cfb1, Cfb2 corresponding to the parasitic capacitances Cgc1-Cgc4 are formed in the common voltage feedback line FL.

Since the parasitic capacitances Cgc1-Cgc4 between the gate lines GL1, GL2 and the touch electrodes TE1-TE4 may be calculated through the feedback capacitances Cfb1, Cfb2 formed in the common voltage feedback line FL, it is possible to detect the feedback capacitances Cfb1, Cfb2 and generate the compensated common voltage Vcom_comp capable of counterbalancing the distortion waveform of the common voltage Vcom based on the feedback capacitances Cfb1, Cfb2.

For the purpose of above, the common voltage feedback line FL extending along the non-display area may be connected to the common voltage compensation circuit 162. The common voltage compensation circuit 162 may generate the compensated common voltage Vcom_comp capable of counterbalancing the distortion waveform of the common voltage Vcom detected through the common voltage feedback line FL, and supply the compensated common voltage Vcom_comp through the touch line TL.

The common voltage compensation circuit 162 may be located inside the touch driving circuit 160 or may be located outside the touch driving circuit 160.

As described above, when distortion of the common voltage Vcom occurs due to parasitic capacitances Cgc1-Cgc4 formed between the gate lines GL1, GL2 and the touch electrodes TE1-TE4 by the scan signals SCAN supplied through the gate lines GL1, GL2, the common voltage compensation circuit 162 may prevent or at least reduce an image error due to distortion of the common voltage Vcom by detecting the distortion of the common voltage Vcom through the common voltage feedback line FL, and supplying the compensated common voltage capable of compensating for the distorted common voltage Vcom.

On the other hand, the distortion of the common voltage Vcom due to the parasitic capacitance Cgc formed between the gate line GL and the touch electrode TE may be changed according to a shape of the touch electrodes TE to which the touch signals are supplied.

In this case, a size of the touch electrode TE disposed on the display panel 110 may correspond to a size of one subpixel or a size of two or more subpixels. In addition, each touch electrode TE may be a plate type without openings or a mesh type with one or more openings.

If one touch electrode TE is a mesh type and has a size corresponding to a size of two or more subpixels, one touch electrode TE has two or more openings, and a position and a size of each of the two or more openings may correspond to a position and a size of the light emitting area of the subpixel.

In this case, the display panel 110 may be a split type in which each of the plurality of touch electrodes TE with same size is separated from each other, or a woven type in which touch electrodes TE with different sizes are arranged in adjacent rows or columns.

The touch display device 100 of the present disclosure may have a different shape of the common voltage feedback line FL for detecting the distortion of the common voltage Vcom according to the structure of the touch electrodes TE.

Since the structure of the touch electrode TE exemplified above corresponds to the split type touch electrodes TE, the structure of the woven type touch electrodes will be further described below.

Figure 9:
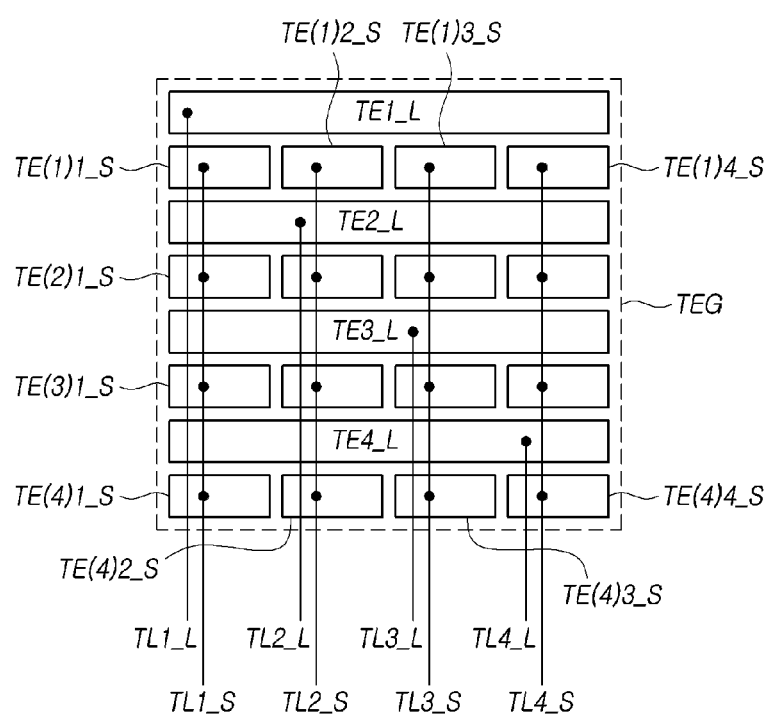
FIG. 9 illustrates a display panel with woven type touch electrodes in a touch display device according to embodiments of the present disclosure.

FIG. 9 illustrates a display panel with woven type touch electrodes in a touch display device according to embodiments of the present disclosure.

Referring to FIG. 9, the woven type display panel 110 of the touch display device 100 according to embodiments of the present disclosure may include a plurality of touch electrode groups TEG, each comprising of four long touch electrodes TE1_L-TE4_L and four groups of short touch electrodes.

In other words, each long touch electrodes TE1_L, TE2_L, TE3_L, TE4_L with long lengths in the row direction may correspond to a total length of four short touch electrodes TE(1)1_S, TE(1)2_S, TE(1)3_S, TE(1)4_S. In this case, the four short touch electrodes (e.g., TE(1)1_S, TE(2)1_S, TE(3)1_S, TE(4)1_S) in a column direction may be connected to one short touch line (e.g., TL1_S). Therefore, four short touch electrodes arranged in the column direction may constitute one short touch electrode block connected by a same line. Also, four long touch electrodes and four short touch electrode blocks connected by the same line corresponding to them may constitute one touch electrode group TEG.

In the case of the woven type 4×4 touch electrode structure, the number of the short touch electrodes in a row where the short touch electrodes are arranged among two adjacent rows is ¼ of the number of long touch electrodes in a row where the long touch electrodes are arranged. Accordingly, each length of the long touch electrodes TE1_L, TE2_L, TE3_L, TE4_L is approximately four times the length of the short touch electrodes.

In this case, the woven type 4×4 touch electrode structure comprises of four long touch electrodes TE1_L, TE2_L, TE3_L, TE4_L and sixteen short touch electrodes TE(1)1_S, TE(1)2_S, TE(1)3_S, TE(1)4_S~TE(4)1_S, TE(4)2_S, TE(4)3_S, TE(4)4_S, but four short touch electrodes (e.g., TE(1)1_S, TE(2)1_S, TE(3)1_S, TE(4)1_S) in a column direction are connected to one short touch line (e.g., TL1_S).

Therefore, four short touch electrodes (e.g., TE(1)1_S, TE(2)1_S, TE(3)1_S, TE(4)1_S) connected to the short touch line (e.g., TL1_S) constitutes one short touch electrode block connected by same line, and sixteen short touch electrodes TE(1)1_S, TE(1)2_S, TE(1)3_S, TE(1)4_S~TE(4)1_S, TE(4)2_S, TE(4)3_S, TE(4)4_S constitute four short touch electrode blocks connected respectively by the same line.

As a result, each long touch line TL1_L, TL2_L, TL3_L, TL4L is connected to four long touch electrodes TE1_L, TE2_L, TE3_L, TE4_L respectively, and each of four short touch electrode blocks is connected to the short touch lines TL1_S, TL2_S, TL3_S, TL4_S respectively. Therefore, in the case of a woven type 4×4 touch electrode structure, eight touch lines TL1_L, TL2_L, TL3_L, TL4L, TL1_S, TL2_S, TL3_S, TL4_S and eight touch channels are required.

Accordingly, compared to the split type touch electrode structure, the woven type touch electrode structure has an effect of reducing the number of touch lines and touch channels.

On the other hand, the size of the touch electrode group TEG may be variously changed, but the size of the touch electrode group TEG may be determined in consideration of a distance between a finger or a stylus for detecting for multi-touch in order to efficiently arrange the touch electrodes TE on the display panel 110 and increase the accuracy of detection for multi-touch.

On the other hand, a plurality of woven type touch electrode groups TEG may be disposed in a horizontal direction and a vertical direction in the display panel 110. In this case, each touch electrode group TEG is electrically separated in an active area in which an image is displayed in the display panel 110, but it may be connected to the touch driving circuit 160 through a touch line TL in a non-active area in which an image is not displayed in the display panel 110.

As described above, in the case of the woven type in which the touch electrodes TE with different sizes are disposed in adjacent rows (or columns), the distortion of the common voltage Vcom in the gate line GL extending along the long touch electrode may be different from the distortion of the common voltage Vcom in the gate line GL extending along the short touch electrode.

Therefore, in the case of the woven type in which the touch electrodes TE with different sizes are disposed in adjacent rows (or columns), the structure of the common voltage feedback line FL for detecting the distorted common voltage Vcom may be changed by reflecting the structure of the touch electrodes TE overlapping with the gate lines GL.

Figure 10:
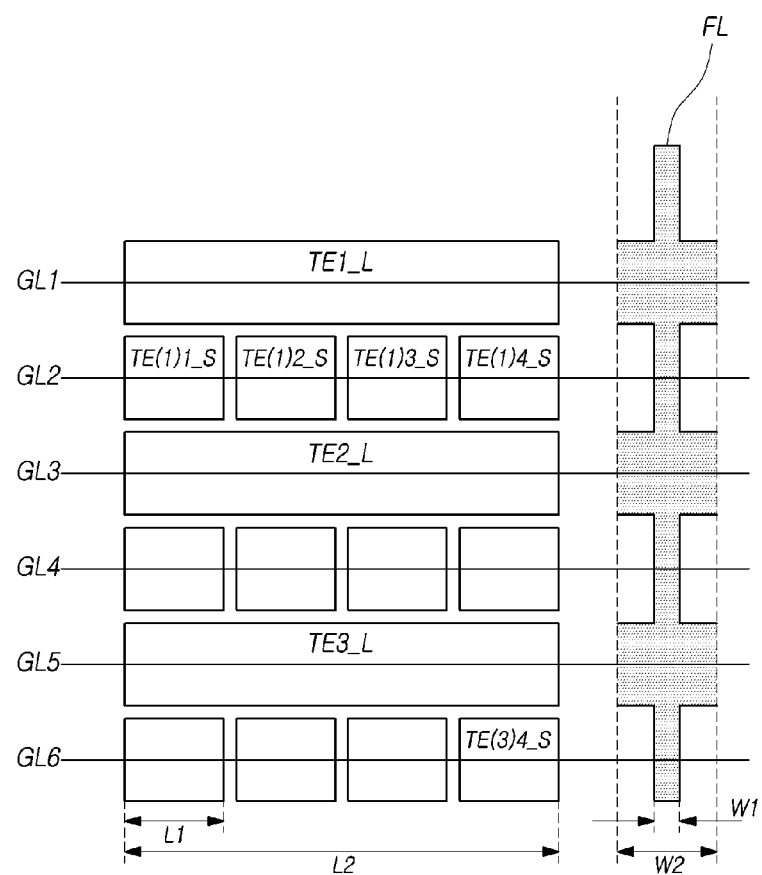
FIG. 10 illustrates an exemplary structure of a common voltage feedback line formed by reflecting the structure of the touch electrodes overlapping the gate lines in the touch display device according to embodiments of the present disclosure.

FIG. 10 illustrates an exemplary structure of a common voltage feedback line formed by reflecting the structure of the touch electrodes overlapping with the gate lines in the touch display device according to embodiments of the present disclosure.

Referring to FIG. 10, the touch electrodes TE of the display panel 110 in the touch display device 100 according to embodiments of the present disclosure may be woven type in which the touch electrodes TE with different sizes are arranged in adjacent rows (or columns).

For example, each long touch electrodes TE1_L, TE2_L, TE3_L, TE4_L with long lengths in the row direction may correspond to a total length of four short touch electrodes TE(1)1_S, TE(1)2_S, TE(1)3_S, TE(1)4_S.

In this case, the number of the short touch electrodes (e.g., TE(1)1_S, TE(1)2_S, TE(1)3_S, TE(1)4_S) in a row is ¼ of the number of adjacent long touch electrodes (e.g., TE1_L). Accordingly, the length L2 of a long touch electrode TE1_L is approximately four times the length L1 of each short touch electrodes TE(1)1_S-TE(1)4_S.

For example, the parasitic capacitance Cgc formed between the gate line GL1 disposed in an area overlapping with the first long touch electrode TE1_L and the first long touch electrode TE1_L may be approximately four times of the parasitic capacitance Cgc formed between the gate line GL2 disposed in an area overlapping with an adjacent first short touch electrode TE(1)1_S and the first short touch electrode TE(1)1_S.

At this time, the common voltage feedback line FL may have a structure that a width W2 which the common voltage feedback line FL for detecting the common voltage Vcom is overlapped with the first gate line GL1 may be formed to be approximately 4 times of a width W1 which the common voltage feedback line FL is overlapped with the second gate line GL2.

That is, a width ratio of the common voltage feedback line FL overlapping with the gate lines GL in the non-display area may be changed depending on a length ratio (e.g., 1:4) of the adjacent long touch electrode (e.g., TE1_L) and the short touch electrode (e.g., TE(1)1_S) in one touch electrode group (TEG).

In other words, a width (W1 or W2) which a common voltage feedback line FL is overlapped with the gate line GL may be formed in proportion to the length (L1 or L2) which the gate line GL is overlapped with the touch electrode TE.

For example, the ratio L1/L2 of the length L2 at which the first gate line GL1 overlaps with the long touch electrode TE1_L, and the length L1 at which the second gate line GL2 overlaps with the short touch electrodes TE(1)1_S-TE(1)4_S may be equal to the ratio W1/W2 of the width W2 at which the common voltage feedback line FL overlaps with the first gate line GL1 and the width W1 at which the common voltage feedback line FL overlaps with the second gate line GL2.

However, the length ratio L1/L2 of the gate line GL overlapping with the touch electrode TE and the width ratio W1/W2 of the gate line GL overlapping with the common voltage feedback line FL may have a deviation due to an error or offset in the manufacturing process within a certain percentage of error range even if the design structure is same.

Meanwhile, there may be one or a plurality of gate lines GL overlapping with the long touch electrodes TE1_L-TE4_L or the short touch electrodes TE(1)1_S-TE(3)4_S. Accordingly, the width (e.g., W1 or W2) of the common voltage feedback line FL may have a value corresponding to the thickness of the long touch electrodes TE1_L-TE4_L or the short touch electrodes TE(1)1_S-TE(3)4_S overlapping with the gate lines GL while overlapping with all corresponding gate lines GL.

As described above, the touch display device 100 may detect the feedback capacitance proportional to the parasitic capacitance Cgc formed between the gate lines GL and the touch electrodes TE by varying the width at which the common voltage feedback line GL overlaps with the gate lines GL according to the length at which the touch electrodes TE overlaps with the gate lines GL.

Here, it illustrated, for convenience as an example, a case in which each of the gate lines GL1-GL6 is disposed on each of the long touch electrodes TE1_L-TE3_L and the short touch electrodes TE(1)1_S-TE(3)4_S in the row direction. However, a plurality of gate lines GL may be disposed on each of the long touch electrodes TE1_L-TE3_L and the short touch electrodes TE(1)1_S-TE(3)4_S.

At this time, the common voltage feedback line FL having a width (W1 or W2) overlapping with the gate lines GL so as to be proportional to the length (L1 or L2) at which the gate lines GL overlap with the touch electrodes TE may be disposed in a direction crossing the gate lines GL in the non-display area in which the gate line GL extends.

When the gate lines GL1 are orthogonal to the touch lines TL, the common voltage feedback line FL may be disposed to be parallel to the touch lines TL in the non-display area.

In this case, the non-display area in which the common voltage feedback line FL is disposed may be an area opposite to the gate driving circuit 120 based on the display area AA.

Accordingly, it is possible to generate the compensated common voltage Vcom_comp capable of counterbalancing the distortion waveform of the common voltage Vcom by detecting the parasitic capacitances Cgc between the gate lines GL and the touch electrodes TE through the feedback capacitances Cfb formed in the common voltage feedback line FL.

For the purpose of above, the common voltage feedback line FL may be connected to the common voltage compensation circuit 162 by extending along the non-display area. The common voltage compensation circuit 162 may generate the compensated common voltage Vcom_comp capable of counterbalancing the distortion waveform of the common voltage Vcom detected through the common voltage feedback line FL, and may supply the compensated common voltage Vcom_comp through the touch line TL.

The common voltage compensation circuit 162 may be located inside the touch driving circuit 160 or may be located outside the touch driving circuit 160.

As described above, when distortion of the common voltage Vcom occurs due to parasitic capacitances Cgc formed between the gate lines GL and the touch electrodes TE by the scan signals SCAN supplied through the gate lines GL, the touch display device 100 of the present disclosure may prevent an image error due to distortion of the common voltage Vcom by detecting the distortion of the common voltage Vcom through the common voltage feedback line FL, and supplying the compensated common voltage capable of compensating for the distorted common voltage Vcom.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device comprising:
    a display panel including a plurality of touch electrodes that are electrically connected to a plurality of touch lines disposed within a display area that displays an image, the plurality of touch lines extending in a first direction;
    a gate driving circuit configured to supply scan signals to the display panel through a plurality of gate lines extending in a second direction, the second direction different from the first direction;
    a touch driving circuit configured to sense a touch by detecting a touch signal from the plurality of touch electrodes during a touch driving period and supply a common voltage to the plurality of touch electrodes through the plurality of touch lines for displaying the image during a display driving period;
    a common voltage feedback line disposed in a non-display area of the display panel and electrically connected to the plurality of touch lines or overlapping with the plurality of gate lines in the non-display area of the display panel; and
    a common voltage compensation circuit configured to detect a distortion of the common voltage and supply a compensated common voltage that is generated based on the distortion of the common voltage through the plurality of touch lines,
    wherein the common voltage feedback line has first and second portions that have different widths from each other and are disposed adjacent to respective edges of the plurality of touch electrodes.

2. The touch display device according to claim 1, wherein the plurality of touch electrodes are split type touch electrodes, at least two of the plurality of touch electrodes having a same size.

3. The touch display device according to claim 1, wherein the plurality of touch electrodes are woven type touch electrodes in which a plurality of first touch electrodes with a first length and a plurality of second touch electrodes with a second length in the second direction are alternately arranged in the first direction where the second length is less than the first length, and at least a portion of the plurality of second touch electrodes arranged in the first direction are connected to one touch line from the plurality of touch lines.

4. The touch display device according to claim 1, wherein the common voltage feedback line electrically connected to the plurality of touch lines is disposed such that the display area is between the common voltage feedback line and the touch driving circuit.

5. The touch display device according to claim 4, further comprising a noise blocking circuit disposed between the common voltage feedback line and the plurality of touch lines.

6. The touch display device according to claim 5, wherein the noise blocking circuit includes a resistor and a capacitor, the resistor and the capacitor connected in parallel.

7. The touch display device according to claim 1, wherein the common voltage feedback line that overlaps the plurality of gate lines is disposed in the first direction such that the display area is between the gate driving circuit and the common voltage feedback line.

8. The touch display device according to claim 1, wherein the first and second portions of the common voltage feedback line have widths corresponding to respective lengths of two touch electrodes from the plurality of touch electrodes that overlaps with the plurality of gate lines in the second direction.

9. The touch display device according to claim 8, wherein a ratio of a width at which the common voltage feedback line overlaps with a first gate line from the plurality of gates lines and a width at which the common voltage feedback line overlaps with a second gate line from the plurality of gates lines is equal to a ratio of a length at which the first gate line overlaps with a first touch electrode from the plurality of touch electrodes, and a length at which the second gate line overlaps with a second touch electrode from the plurality of touch electrodes.

10. The touch display device according to claim 1, wherein the compensated common voltage is a signal that counterbalances the distortion of the common voltage due to a parasitic capacitance caused by overlapping of the scan signals supplied through adjacent gate lines from the plurality of gate lines.

11. The touch display device according to claim 1, wherein the common voltage compensation circuit includes an operational amplifier, the operational amplifier including an inverting input terminal that receives the common voltage fed back through the common voltage feedback line through a first resistor, and a non-inverting input terminal that receives a reference voltage.

12. A touch driving device comprising:
a plurality of touch lines extending in a direction, the plurality of touch lines configured to transmit touch signals to a display panel that includes a plurality of touch electrodes;
a touch sensing circuit configured to supply touch driving signals to the plurality of touch electrodes through the plurality of touch lines and receive touch sensing signals from the plurality of touch electrodes during a touch driving period, and supply a common voltage to the plurality of touch electrodes through the plurality of touch lines during a display driving period;
a touch controller configured to detect touch presence responsive to the touch sensing signals and calculate touch coordinates according to the touch sensing signals;
a common voltage feedback line electrically connected to the plurality of touch lines or overlapping with the plurality of gate lines; and
a common voltage compensation circuit configured to detect a distortion of the common voltage and supply a compensated common voltage that is generated based on the distortion of the common voltage through the plurality of touch lines,
wherein the common voltage feedback line has first and second portions that have different widths from each other and are disposed adjacent to respective edges of the plurality of touch electrodes.

13. The touch driving device according to claim 12, wherein the compensated common voltage is a signal that counterbalances a distortion of the common voltage due to a parasitic capacitance caused by overlapping of scan signals supplied through adjacent gate lines from the plurality of gate lines.

14. The touch driving device according to claim 12, wherein the common voltage compensation circuit includes an operational amplifier, the operational amplifier including an inverting input terminal that receives the common voltage fed back through the common voltage feedback line through a first resistor, and a non-inverting input terminal that receives a reference voltage.

15. A display panel comprising:
a plurality of touch electrodes, each of the plurality of touch electrodes corresponding to a respective plurality of subpixels included in the display panel;
a plurality of touch lines extending in a first direction, the plurality of touch lines configured to transmit touch signals to the plurality of touch electrodes;
a plurality of gate lines extending in a second direction that is different from the first direction, the plurality of gate lines configured to transmit scan signals to the plurality of subpixels; and
a common voltage feedback line electrically connected to the plurality of touch lines or overlapping with the plurality of gate lines in a non-display area of the display panel,
wherein the common voltage feedback line has first and second portions that have different widths from each other and are disposed adjacent to respective edges of the plurality of touch electrodes.

16. The display panel according to claim 15, wherein the common voltage feedback line electrically connected to the plurality of touch lines is disposed such that a display area is between the common voltage feedback line and a touch driving circuit, the touch driving circuit configured to supply the touch signals to the plurality of touch electrodes via the plurality of touch lines.

17. The display panel according to claim 16, further comprising a noise blocking circuit disposed between the common voltage feedback line and the plurality of touch lines.

18. The display panel according to claim 17, wherein the noise blocking circuit includes a resistor and a capacitor, the resistor and the capacitor connected in parallel.

19. The display panel according to claim 15, wherein the common voltage feedback line that overlaps the plurality of gate lines is disposed in the first direction such that a display area is between the common voltage feedback line and a gate driving circuit that is configured to supply the scan signals.

20. The display panel according to claim 15, wherein the first and second portions of the common voltage feedback line have widths corresponding to respective lengths of two touch electrodes from the plurality of touch electrodes that overlaps with the plurality of gate lines in the second direction.

* * * * *